(12) United States Patent
Igarashi et al.

(10) Patent No.: US 10,771,775 B2
(45) Date of Patent: Sep. 8, 2020

(54) IMAGING DEVICE, IMAGING SYSTEM, MOVING BODY, AND CONTROL METHOD

(71) Applicant: CANON KABUSHIKI KAISHA, Tokyo (JP)

(72) Inventors: Shinya Igarashi, Kawasaki (JP); Noriyuki Shikina, Hachioji (JP); Yasushi Iwakura, Kawaguchi (JP); Yoichi Wada, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 22 days.

(21) Appl. No.: 15/717,794

(22) Filed: Sep. 27, 2017

(65) Prior Publication Data
US 2018/0098060 A1    Apr. 5, 2018

(30) Foreign Application Priority Data

Sep. 30, 2016  (JP) ................................ 2016-193124
Jul. 27, 2017  (JP) ................................ 2017-145582

(51) Int. Cl.
| H04N 17/00 | (2006.01) |
| H04N 5/367 | (2011.01) |
| H04N 5/374 | (2011.01) |
| B60Q 9/00 | (2006.01) |
| H04N 5/378 | (2011.01) |

(52) U.S. Cl.
CPC ............. *H04N 17/002* (2013.01); *B60Q 9/00* (2013.01); *H04N 5/367* (2013.01); *H04N 5/374* (2013.01); *H04N 5/378* (2013.01)

(58) Field of Classification Search
CPC ........ H04N 5/217; H04N 5/378; H04N 5/369; H04N 5/357
See application file for complete search history.

(56) References Cited

U.S. PATENT DOCUMENTS

| 7,126,631 | B1 * | 10/2006 | Minemier | H04N 5/367 |
| | | | | 348/246 |
| 2002/0037462 | A1 * | 3/2002 | Ogata | G03F 7/162 |
| | | | | 430/30 |
| 2004/0239770 | A1 | 12/2004 | Misawa | |
| 2006/0125939 | A1 * | 6/2006 | Yoneda | H04N 5/3675 |
| | | | | 348/246 |
| 2007/0019088 | A1 | 1/2007 | Saito | |
| 2007/0194962 | A1 * | 8/2007 | Asayama | H03M 1/1014 |
| | | | | 341/144 |

(Continued)

FOREIGN PATENT DOCUMENTS

| CN | 101431619 A | 5/2009 |
| CN | 101677359 A | 3/2010 |

(Continued)

*Primary Examiner* — Tracy Y. Li
(74) *Attorney, Agent, or Firm* — Canon U.S.A., Inc. IP Division

(57) ABSTRACT

An imaging device comprising a plurality of pixels and a processing unit. The plurality of pixels includes (i) a light-receiving pixel arranged to receive incident light and output a light signal based on the incident light, and (ii) a reference pixel arranged to output a pixel signal for configuring a failure detection signal. The processing unit is arranged to determine whether or not the failure detection signal is correct based on abnormality information indicating the abnormality of the reference pixel.

18 Claims, 13 Drawing Sheets

(56) References Cited

U.S. PATENT DOCUMENTS

| | | |
|---|---|---|
| 2009/0066793 A1 | 3/2009 | Takeda |
| 2009/0122174 A1 | 5/2009 | Kano |
| 2014/0002698 A1* | 1/2014 | Shoyama ............... H04N 5/367 348/242 |
| 2015/0002706 A1* | 1/2015 | Ohsawa ............... H04N 5/3675 348/246 |
| 2015/0077570 A1 | 3/2015 | Okita |
| 2015/0195462 A1 | 7/2015 | Kano |

FOREIGN PATENT DOCUMENTS

| | | |
|---|---|---|
| CN | 103533262 A | 1/2014 |
| JP | 2000077637 A | 3/2000 |
| JP | 2003234966 A | 8/2003 |
| JP | 2007028326 A | 2/2007 |
| JP | 2007174124 A | 7/2007 |
| JP | 2008099003 A | 4/2008 |
| JP | 2009-049753 A | 3/2009 |
| JP | 2009118427 A | 5/2009 |
| JP | 2012199913 A | 10/2012 |

\* cited by examiner

FIG.7A
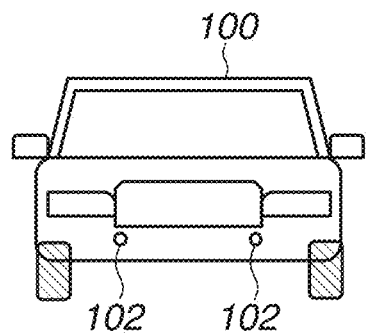
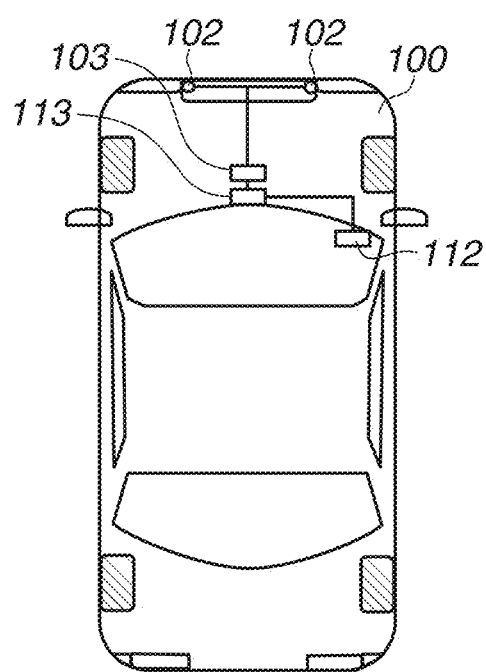
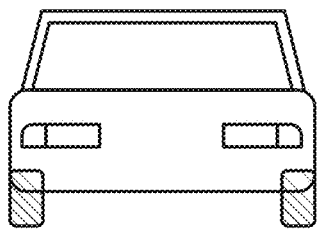

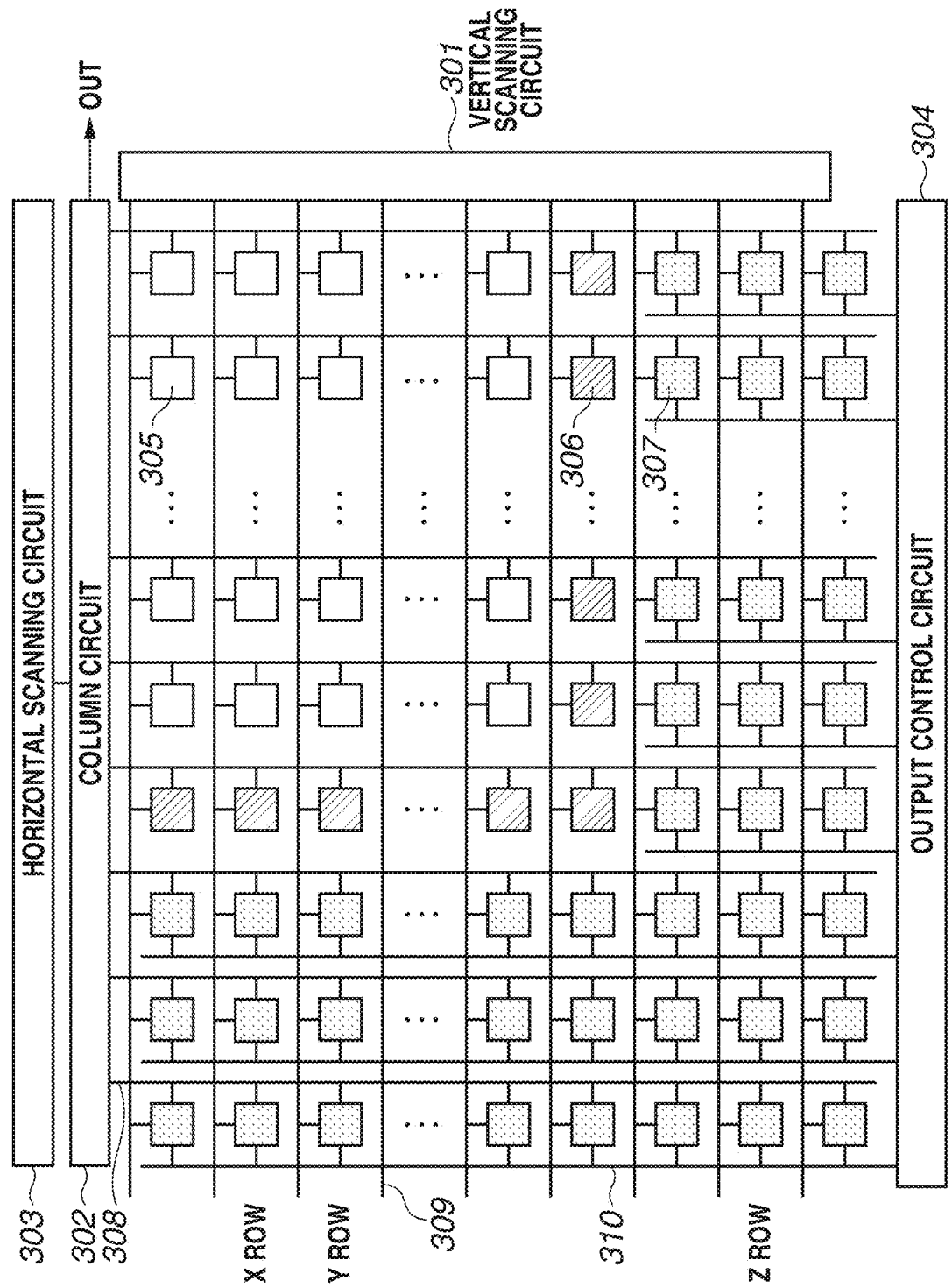

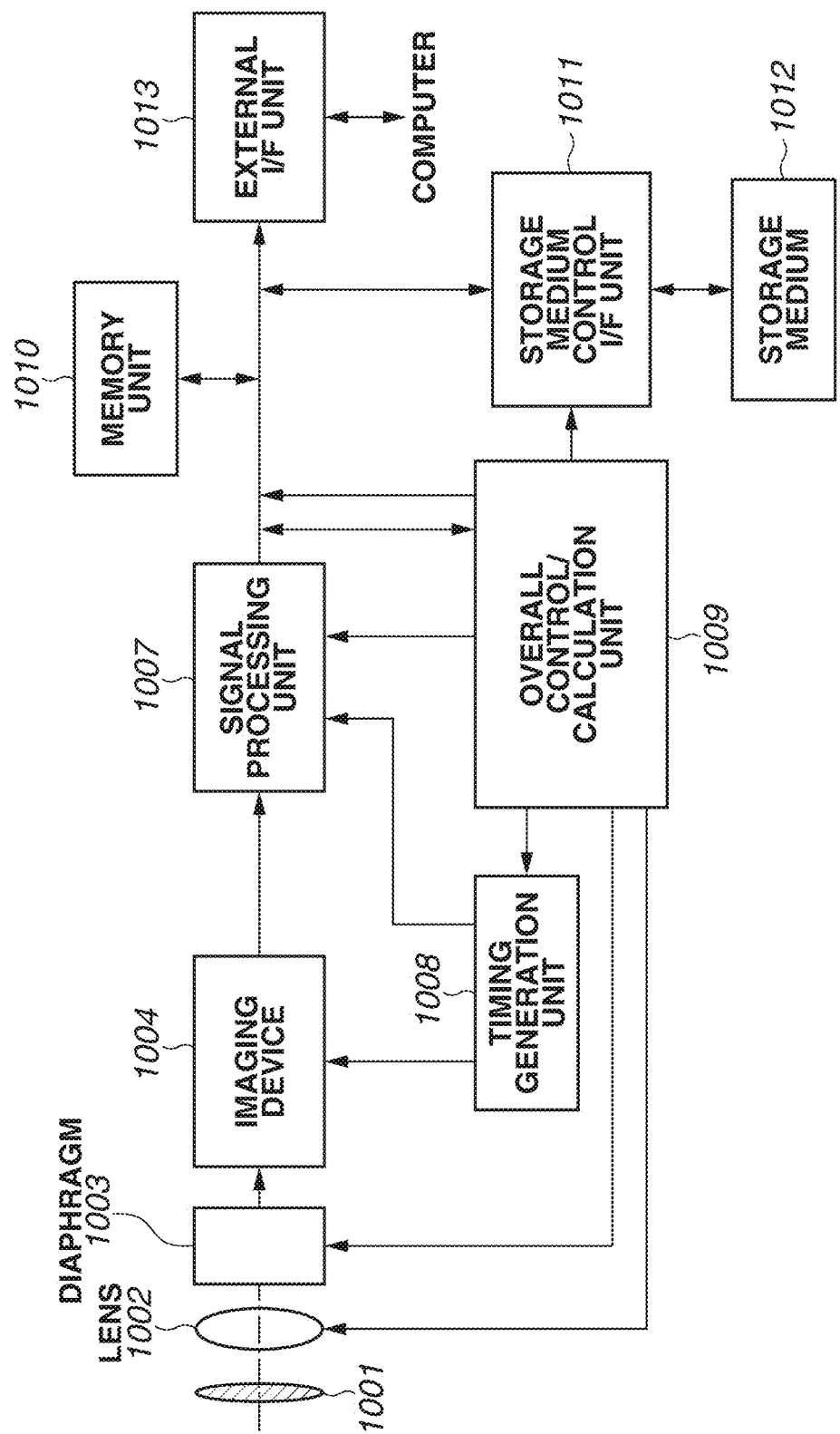

“IMAGING DEVICE, IMAGING SYSTEM, MOVING BODY, AND CONTROL METHOD

BACKGROUND OF THE INVENTION

Field of the Invention

The present invention relates to an imaging device, an imaging system, a moving body, and a control method.

Description of the Related Art

An imaging device discussed in Japanese Patent Application Laid-Open No. 2009-118427 includes an effective pixel region and a non-effective pixel region. Light enters the effective pixel region from outside. Pixels arranged in the effective pixel region include photodiodes (PDs) that generate an electrical signal by photoelectric conversion.

The entire non-effective pixel region is covered with a light-shielding film. The non-effective pixel region includes a reference region and a failure detection pattern region. Pixels arranged in the reference region generate a signal serving as a reference of an image signal level. In the failure detection pattern region, pixels including a photodiode (PD pixels) and pixels not including a photodiode (non-PD-pixels) are arrayed. A signal according to an array pattern of the PD-provided pixels and the PD-non-provided pixels can be obtained from the failure detection pattern region.

Determination of failure may be performed by setting the failure detection region to provide a predetermined signal pattern and comparing the predetermined signal pattern with the actual, generated signal pattern. If the actual signal pattern does not match the predetermined signal pattern, the imaging device is determined to have a failure.

However, it has been appreciated that such failure detection methods may incorrectly determine that the imaging device has a failure.

SUMMARY OF THE INVENTION

According to an aspect of the present invention, an imaging device includes a plurality of pixels including a light-receiving pixel arranged to receive incident light and output a pixel signal based on the incident light, and a reference pixel arranged to output a pixel signal for configuring a failure detection signal, and a processing unit arranged to determine whether or not the failure detection signal is correct based on abnormality information indicating the abnormality of the reference pixel.

According to another aspect of the present invention, an imaging system includes a signal processing unit configured to process a pixel signal according to incident light and a failure detection signal for detecting a failure of an imaging device, the pixel signal and the failure detection signal having been output from the imaging device, and determine whether or not the failure detection signal is correct based on abnormality information indicating the abnormality of a pixel of the imaging device.

According to yet another aspect of the present invention, a control method includes storing abnormality information indicating the abnormality of a pixel of an imaging device, receiving a failure detection signal for detecting a failure of the imaging device, and determining whether or not the failure detection signal is correct based on the stored abnormality information.

Further features of the present invention will become apparent from the following description of exemplary embodiments with reference to the attached drawings.

BRIEF DESCRIPTION OF THE DRAWINGS

FIG. 7A is a diagram illustrating an exemplary embodiment of a moving body.

FIG. 8 is a diagram schematically illustrating an overall configuration of an imaging device.

FIG. 9 is a block diagram illustrating a configuration of an exemplary embodiment of an imaging system.

DESCRIPTION OF THE EMBODIMENTS

Figure 1:
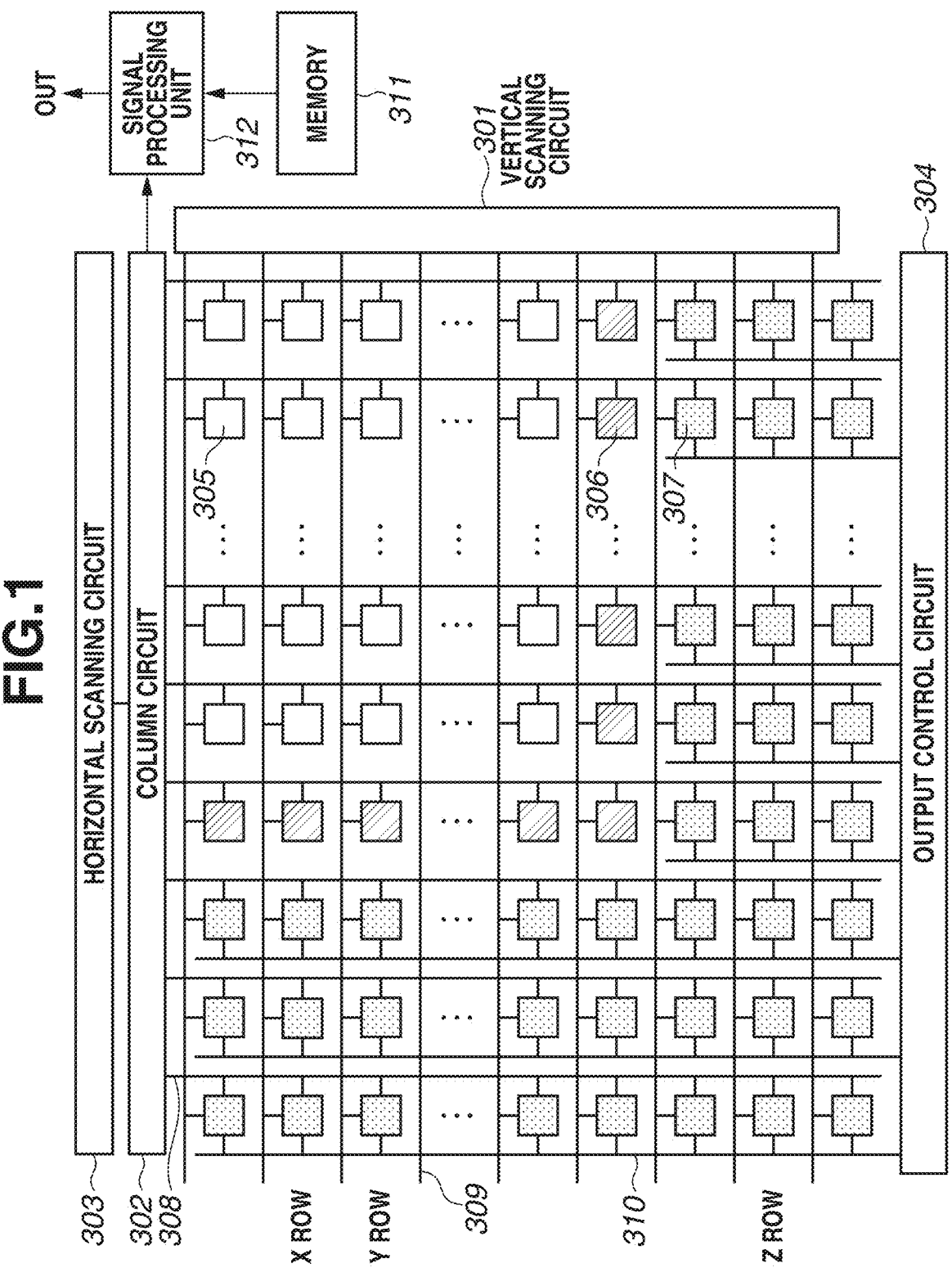
FIG. 1 is a diagram schematically illustrating an overall configuration of an imaging device.

In the exemplary embodiments herein a failure can be accurately detected.

The technology in Japanese Patent Application Laid-Open No. 2009-118427 discusses a method for determining whether a signal obtained from a failure detection pattern region matches with a predetermined pattern. However, this method has a problem of not accurately detecting a failure and a wrong operation of an imaging device. More specifically, failure detection methods such as that described in JP2009-118427 may determine that the imaging device is not working properly even though the effective pixel region is functioning normally. This type of situation may occur, for example, when only the failure detection region of the imaging device comprises a defective pixel. Such situations may lead to the imaging device being shut down or prevented from taking an image even though the effective area may capture an image. This issue is particularly problematic for situations when it is desirable to keep the imaging device functioning at all possible times such as, for example, when using the imaging device to control a car or other type of moving object.

For example, even if an abnormality is caused in a pixel in the failure detection pattern region, an abnormality or a failure may not be caused in a pixel in an effective pixel region or in a circuit for reading a pixel in the effective pixel region. This type of situation is, however, not detectable with techniques such as that in JP-2009-118427. The inventors of the present application have, however, appreciated that it is useful to be able to determine such situations because the signal from a pixel in the failure detection pattern region is not used in imaging, and therefore the imaging device may still use the effective area to obtain an image. In other words, there is a possibility that the imaging device may be erroneously determined to have a failure if an abnormality is caused in a pixel in the failure detection pattern region.

One exemplary embodiment of the present invention is an imaging device. The imaging device includes a plurality of pixels arranged in a matrix. The plurality of pixels includes a light-receiving pixel and a reference pixel. Light enters the light-receiving pixel from an outside—i.e. external light may fall incident on the light-receiving pixel and the light-receiving pixel may output a pixel signal based on the incident light. The reference pixel outputs a pixel signal for configuring a failure detection signal. Thus, it will be appreciated that a failure detection signal may be generated based on the pixel signals from one or more reference pixels.

The failure detection signal provides information for determining whether an operation of the imaging device is functioning normally. For example, a failure detection signal may include information indicating positions of rows or columns. In some embodiments, a plurality of failure detection signals may be generated, wherein the plurality of failure detection signals have different signal values that are respectively assigned to different rows or different columns. One failure detection signal is configured from a pixel signal from one reference pixel or pixel signals from a plurality of reference pixels. The pixel signals that configure a failure detection signal may originate from reference pixels located in one or more rows and/or columns.

In an exemplary embodiment in which one failure detection signal, or each of a plurality of failure detection signals, is configured from the pixel signal from a single reference pixel, at least one reference pixel is arranged in each of rows. The reference pixels in the different rows output signals having different levels from each other. The level means a current value or a voltage value of the pixel signal. The level of the pixel signal of the reference pixel indicates a signal value of the failure detection signal. In another exemplary embodiment, a plurality of reference pixels is arranged in one row. In this exemplary embodiment, a failure detection signal is generated based on the pixel signals from the plurality of reference pixels in the row. For example, each of the reference pixels outputs a pixel signal of a high level or a pixel signal of a low level. In a case where N reference pixels are arranged, the failure detection signal is configured from a combination of the pixel signals of a high level and the pixel signals of a low level, as an N-bit digital signal (e.g. N-bit binary signal). The pixel signal of a high level corresponds to "1" in the bits, and the pixel signal of a low level corresponds to "0" in the bits. In this case, the pattern of 0's and 1's forming the N-bit digital signal is used as the signal value of the failure detection signal.

In the above description, an imaging device including a reference pixel in each of rows has been exemplified. However, it will be appreciated that in other embodiments the imaging device may comprise a reference pixel in each column of the pixel matrix—therefore, in the embodiments herein the term "row" may be rephrased with the term "column".

The imaging device of the present exemplary embodiment acquires information about abnormality of a reference pixel. The abnormality of a pixel indicates a state in which the pixel cannot function properly to output a pixel signal. For example, a pixel with an abnormality may not function properly to output pixel signals of different levels according to a control signal. Instead, the pixel may output a signal of the same level on a constant basis, regardless of the control signal. In the present specification, the pixel having the abnormality may be simply called abnormal pixel.

The abnormality of a pixel can be identified based on an inspection performed before shipment of the imaging device, before and after an imaging operation, or during the imaging operation. The inspection method for identifying the abnormality of a pixel may be based on a known technology. The imaging device may include memory. The memory preferably stores abnormality information indicating the abnormality of an identified reference pixel. Alternatively, the imaging device may acquire abnormality information indicating the abnormality of the identified reference pixel from an external source.

The stored/acquired abnormality information may indicate that a pixel in a predetermined position has an abnormality. Alternatively, the abnormality information may indicate that any of the pixels in a predetermined range (such as the pixels in one or more rows or columns) has an abnormality.

According to the imaging device of the present exemplary embodiment, a determination as to whether a pixel signal is normally output from the imaging device can be determined based on the failure detection signal. That is, the imaging device of the present embodiment can determine whether the pixel signal has been generated when the imaging device is functioning normally, based on the failure detection signal. In one exemplary embodiment, the imaging device includes a signal processing unit that performs this determination.

For example, the signal processing unit may determine whether pixel signals of a plurality of rows are output in predetermined order. In this case, the signal processing unit may determine whether a plurality of the failure detection signals output in order changes as expected—i.e. changes in accordance with the read pixel signals of the plurality of rows. For example, in a case where the failure detection signal from the odd rows of the pixel matrix has a different signal value to the failure detection signal from the even rows of the pixel matrix, the signal processing unit may determine whether the read failure detection signals provide alternating signal values. In this way, it can be determined as to whether the pixel signals of the plurality of rows are output in predetermined order.

Alternatively, the signal processing unit may determine whether the pixel signal of a specified row is appropriately output. For example, the signal processing unit may determine whether the signal value of the failure detection signal output, and the pixel signal, match the signal value assigned to the specified row. That is, the signal processing unit may determine whether a failure detection signal, and pixel signal, match with an expected signal value. The reference pixel(s) may be instructed to provide an expected signal value by application of a suitable control signal—e.g. a predetermined voltage or current. In this way, it can be determined as to whether the pixel signal of a predetermined row is normally output.

In the present exemplary embodiment, the imaging device is determined to operate normally, or the imaging device is determined to output signals normally, when it is determined that the failure detection signal outputs an expected signal value. The signal processing unit determines that the imaging device does not operate normally, or that the imaging device has a failure, when the signal value of the failure detection signal is different from the expected signal value.

The signal processing unit determines whether the reference pixel that outputs the failure detection signal has an abnormality, when determining the operation of the imaging device. If it is determined that a failure detection signal is output from a reference pixel having an abnormality, the signal processing unit performs processing for invalidating the failure detection signal, processing for replacing the failure detection signal with another signal, or processing for not making a determination as to whether the imaging device has a failure.

As described above, in the present exemplary embodiment, a determination as to whether a failure detection signal is correct or wrong may be made using information indicating the abnormality of a reference pixel. In this way, the possibility of erroneously determining that the imaging device has a failure due to the occurrence of an abnormality in a reference pixel can be decreased. Thus, the failure can be accurately detected.

One exemplary embodiment of the present invention is an imaging system. The imaging system includes a signal processing unit that processes a signal outputs from an imaging device to acquire an image signal. Further, the signal processing unit receives a failure detection signal output from the imaging device. The failure detection signal is the same as that described in the above exemplary embodiment of the imaging device. Like the above exemplary embodiment of the imaging device, the signal processing unit determines whether a pixel signal is normally output from the imaging device based on the failure detection signal.

The imaging system of the present exemplary embodiment acquires abnormality information indicating the abnormality of a pixel of the imaging device. The signal processing unit determines whether a reference pixel that outputs the failure detection signal has an abnormality, using the abnormality information, when determining an operation of the imaging device. If the failure detection signal is output from a reference pixel having an abnormality, the signal processing unit performs processing for invalidating the failure detection signal, processing for replacing the failure detection signal with another signal, or processing for not making determination as to whether the imaging device has a failure.

The imaging system may include a memory that stores the abnormality information. The abnormality information is acquired through an inspection performed before shipment and is stored in the memory. Alternatively, the imaging system may receive the abnormality information from the imaging device.

As per the above description, the present exemplary embodiment determines whether or not a failure detection signal is correct based on the abnormality information indicating the abnormality of a pixel of the imaging device. In this way, the present embodiment reduces the possibility of erroneously determining that the imaging device has a failure due to the occurrence of an abnormality in a reference pixel. Thus, the failure can be accurately detected.

The above-described imaging device or imaging system is used for a camera, a monitoring device, a robot, or the like. The above-described imaging device or imaging system is used for a moving body. Especially, in the moving body for transporting humans, such as a vehicle, an aircraft, or other such vessels where it is desirable for the vessel to be equipped with reliable devices (e.g. an imaging device). It will be appreciated that, the imaging devices and/or the imaging systems of the above-described embodiments, allow the determination of whether a pixel signal is normally output from the imaging device. Thus, when the imaging device has a failure, the imaging operation can be stopped and a warning can be issued about occurrence of the failure. To issue a warning about the failure, the moving body may include an informing unit such as a heat generator, a light emitter, a display, a speaker, or a vibrator.

Hereinafter, exemplary embodiments of the present invention will be described in detail using the drawings. The present invention is not limited to only the exemplary embodiments described below. A modification in which a part of a configuration of the exemplary embodiments described below is changed without departing from the gist of the present invention is also an exemplary embodiment of the present invention. Further, an example in which a part of a configuration of any of the exemplary embodiments is added to another exemplary embodiment, and an example in which a part of a configuration of any of the exemplary embodiments is replaced with a part of a configuration of another exemplary embodiment, are also exemplary embodiments of the present invention.

A first exemplary embodiment will be described. FIG. 1 schematically illustrates a configuration of an imaging device according to the present exemplary embodiment. The imaging device includes a plurality of pixels 305, 306, and 307 arranged in a matrix. The plurality of pixels includes a light-receiving pixel 305, an optical black pixel (hereinafter, OB pixel) 306, and a reference pixel 307. The imaging device further includes a vertical scanning circuit 301, a column circuit 302, a horizontal scanning circuit 303, an output control circuit 304, an output line 308, a drive control line 309, an output control line 310, a memory 311, and a signal processing unit 312.

The plurality of pixels 305, 306, and 307 included in one row is connected to the common drive control line 309. The vertical scanning circuit 301 supplies a drive signal to the plurality of pixels 305, 306, and 307 via the drive control line 309. Pixel signals are output to the output lines 308 in parallel from the plurality of pixels 305, 306, and 307 included in one row, based on the drive signal. The plurality of pixels 305, 306, and 307 included in one column is connected to the common output line 308. The pixel signals output to the output lines 308 are input to the column circuit 302. One column circuit 302 is arranged to each of the output lines 308. The column circuit 302 performs operations such as amplification of the pixel signals, analogue-digital conversion for the pixel signals, storing of the pixel signals, and noise removal of the pixel signals. The horizontal scanning circuit 303 sequentially reads the pixel signals from the column circuits 302. The memory 311 stores abnormality information indicating the abnormality of the reference pixel 307. The signal processing unit 312 determines whether a failure detection signal is correct or wrong (i.e. whether or not a failure detection signal is correct), using a pixel signal from the reference pixel 307 and the abnormality information stored in the memory 311.

The light-receiving pixel 305 receives light from an outside (i.e. light-receiving pixel 305 receives external light). The light-receiving pixel 305 outputs the pixel signal based on the incident light—i.e. the light-receiving pixel 305 outputs a light signal based on the received light. The OB pixel 306 is covered with a light-shielding film (not illustrated). The light-shielding film is arranged to expose the light-receiving pixel 305. The OB pixel 306 outputs the pixel signal of a level corresponding to a state where no incident light exists, i.e., a pixel signal of a dark level. The pixel signal output by the OB pixel 306 can include a noise component that is different in every pixel. Thus, there is a possibility that the pixel signals obtained from each OB pixel 306 varies with position. However, the amount of the noise component is random because it is due to manufacturing variation and thermal noise. Accordingly, the pixel signal from the OB pixel 306 is not information for identifying positions of a row and a column.

The reference pixel 307 outputs the pixel signal for configuring the failure detection signal. In the first exemplary embodiment, any of the above-described failure detection signals is used. In the present exemplary embodiment, the output control circuit 304 controls a level of the pixel signal output by the reference pixel 307. More specifically, the output control circuit 304 supplies a predetermined voltage to the output control line 310. The reference pixel 307 outputs the pixel signal of the level according to the voltage of the output control line 310. The reference pixel 307 may be covered with a light-shielding film (not illustrated). Alternatively, the reference pixel 307 may be exposed because the reference pixel 307 does not include a photodiode.

Next, configurations of the light-receiving pixel 305, the OB pixel 306, and the reference pixel 307 will be described. FIG. 2A illustrates an equivalent circuit of the light-receiving pixel 305 and the OB pixel 306. FIG. 2B illustrates an equivalent circuit of the reference pixel 307.

As illustrated in FIG. 2A, the light-receiving pixel 305 and the OB pixel 306 include a photodiode (hereinafter, described as PD) 401. The PD 401 converts the incident light into an electric charge by photoelectric conversion. In other words, the PD 401 is an example of a photoelectric converter. The PD 401 of the light-receiving pixel 305 has light entering from an outside and thus the PD 401 of the light-receiving pixel 305 accumulates the electric charge caused by the photoelectric conversion. Meanwhile, the PD 401 of the OB pixel 306 is light-shielded. Thus, the PD 401 of the OB pixel 306 accumulates an electric charge that can become a noise such as a dark current. Note that the PD 401 of the OB pixel 306 may be omitted.

As illustrated in FIG. 2B, the reference pixel 307 does not include a PD 401. Instead, the reference pixel 307 is connected to the output control lines 310. In the present exemplary embodiment, the output control line 310 that supplies a voltage Va, and the output control line 310 that supplies a voltage Vb different from the voltage Va are connected to the reference pixel 307. The output control circuit 304 selects to which of the two output control lines 310 the voltage is supplied. With such a configuration, the reference pixel 307 can selectively output the pixel signal of the level corresponding to the voltage Va and the pixel signal of the level corresponding to the voltage Vb. When the reference pixel 307 does not output a plurality of the pixel signals of different levels, the reference pixel 307 may just be connected to either the output control line 310 that supplies the voltage Va or the output control line 310 that supplies the voltage Vb.

The light-receiving pixel 305, the OB pixel 306, and the reference pixel 307 include a transfer transistor 402. The transfer transistor 402 of the light-receiving pixel 305 and the OB pixel 306 transfers the electric charge of the PD 401 to a floating diffusion (FD) node. Meanwhile, the transfer transistor 402 of the reference pixel 307 transfers the voltage Va or the voltage Vb to the FD node. A gate of the transfer transistor 402 is connected to the drive control line 309 that supplies a drive signal TX. The transfer transistor 402 is controlled with the drive signal TX.

The light-receiving pixel 305, the OB pixel 306, and the reference pixel 307 include an amplification transistor 404. The FD node is connected to a gate of the amplification transistor 404. The amplification transistor 404 outputs the pixel signal based on the voltage of the FD node to the output line 308. For example, the amplification transistor 404 and a current source (not illustrated) connected to the output line 308 configures a source follower circuit.

The light-receiving pixel 305, the OB pixel 306, and the reference pixel 307 include a reset transistor 403. The reset transistor 403 resets the voltage of the FD node. A drain of the reset transistor 403 is connected to a node that supplies a reset voltage Vres. In the present exemplary embodiment, a power supply voltage Vdd is used as the reset voltage Vres. A gate of the reset transistor 403 is connected to the drive control line 309 that supplies a drive signal RES. The reset transistor 403 is controlled to ON or OFF with the drive signal RES.

The light-receiving pixel 305, the OB pixel 306, and the reference pixel 307 include a selection transistor 405. The selection transistor 405 is arranged in an electric path between the amplification transistor 404 and the output line 308. A gate pf the selection transistor 405 is electrically connected to the drive control line 309 that supplies a drive signal SEL. The selection transistor 405 is controlled to ON or OFF according to the drive signal SEL. When the selection transistor 405 is ON, the corresponding amplification transistor 404 outputs the pixel signal to the output line 308. When the selection transistors 405 of a part of a plurality of pixels connected to one output line 308 are ON and the selection transistors 405 of the other pixels are OFF, the pixels that output the pixel signal are selected. Two or more pixels connected to one output line 308 may be selected at the same time.

With such a configuration, the light-receiving pixel 305 can output the pixel signal according to the incident light (i.e. light signal). The OB pixel 306 can output the pixel signal of the dark level. Further, the reference pixel 307 selectively outputs the pixel signal of the level corresponding to the voltage Va and the pixel signal of the level corresponding to the voltage Vb.

Figure 2:
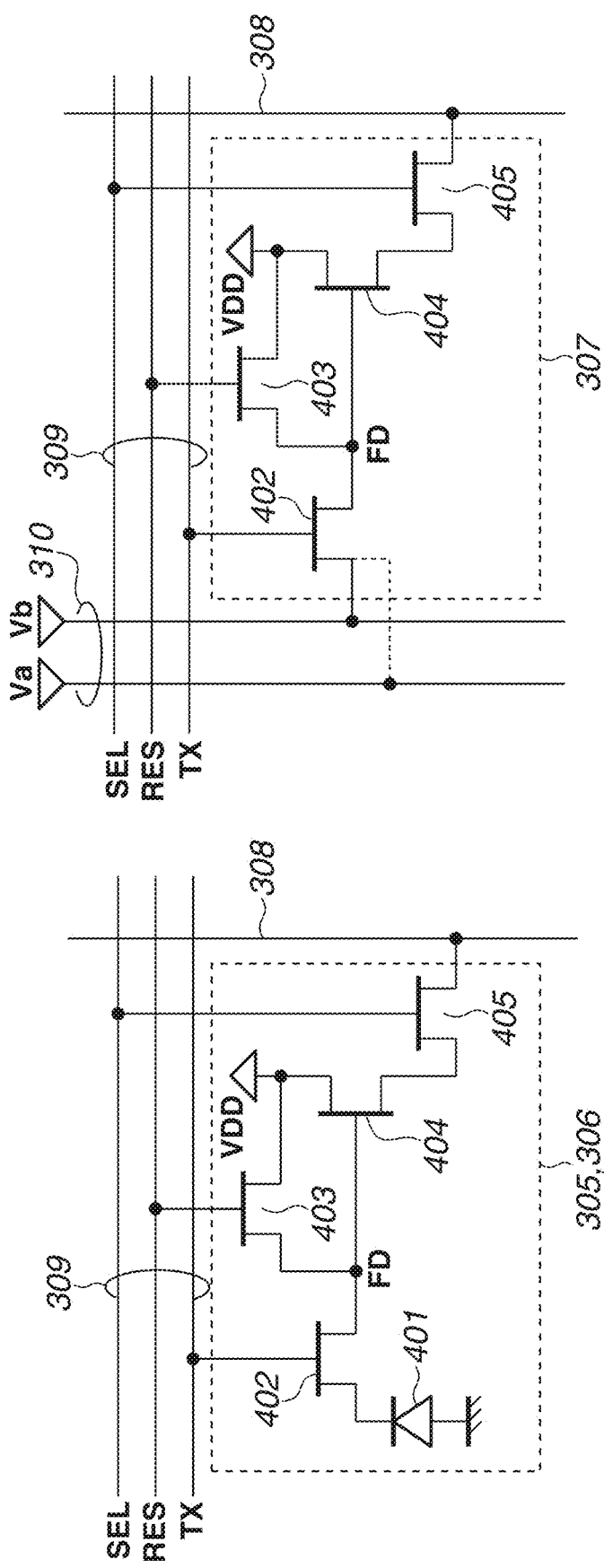
FIGS. 2A and 2B are diagrams illustrating equivalent circuits of pixels of the imaging device.
Figure 10:
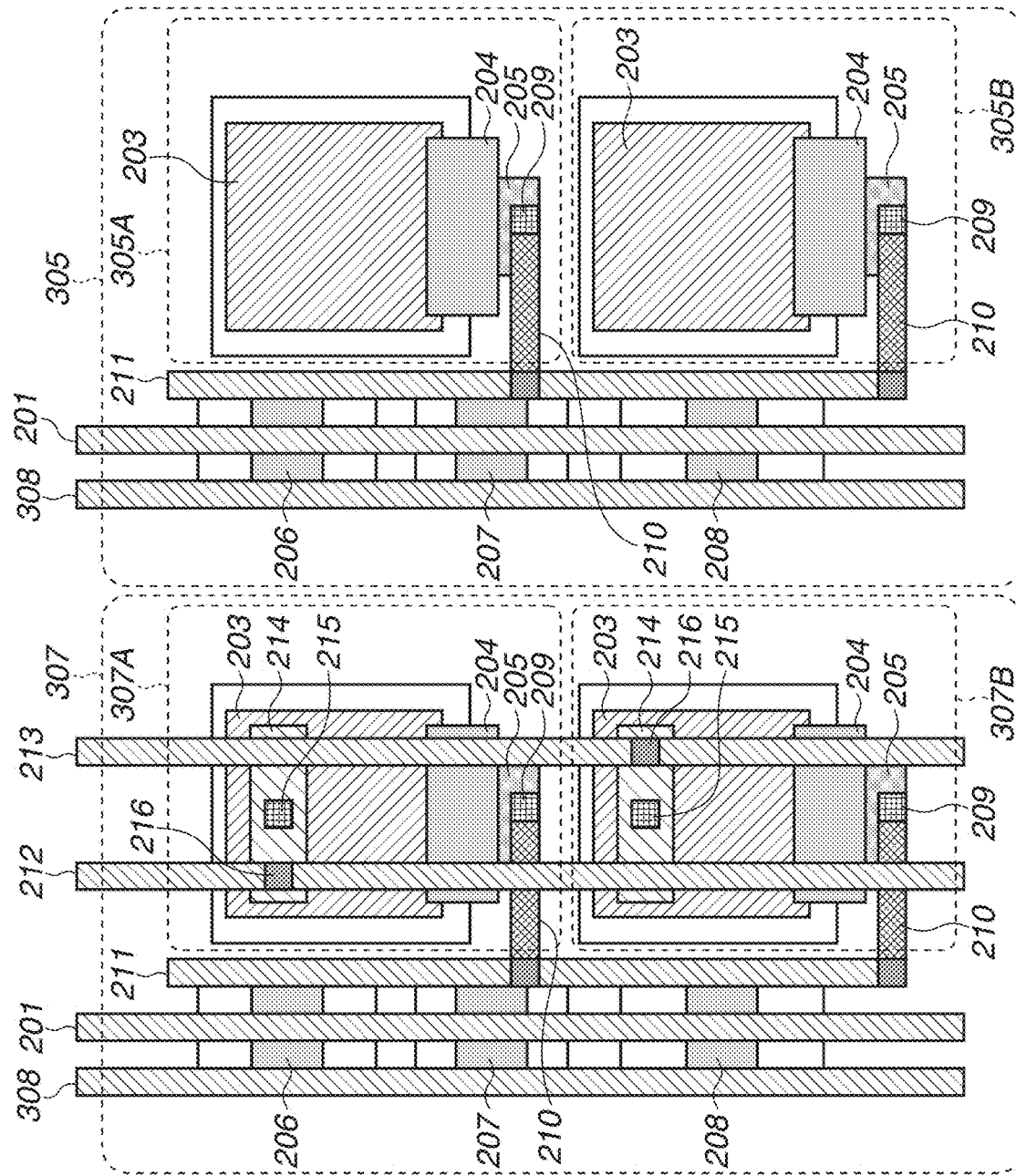
FIG. 10 is a diagram schematically illustrating plane structures of pixels of an imaging device.

Structures of the light-receiving pixel 305 and the reference pixel 307 will be described in detail. FIG. 10 schematically illustrates plan-view structures of the light-receiving pixel 305 and the reference pixel 307 of the imaging device. A member having the same function as the member illustrated in FIG. 2 is also denoted with the same sign as the sign denoted in FIG. 2 in FIG. 10.

Power supply wiring 201 is wiring that transmits a power supply voltage VDD to a pixel for image acquisition. The light-receiving pixel 305 includes a semiconductor region 203 as a part of the PD 401. The semiconductor region 203 is an electric charge accumulation portion that accumulates the electric charge caused by photoelectric conversion. Here, the conductivity type of the semiconductor region 203 is the N type. Further, the electric charge accumulated in the semiconductor region 203 is an electron.

The light-receiving pixel 305 includes a gate 204 of the transfer transistor 402 and a floating diffusion region 205 as a part of the FD node. FIG. 10 illustrates a configuration in which two light-receiving pixels 305 share one amplification transistor 404. Thus, FIG. 10 illustrates a set of the semiconductor region 203 and the floating diffusion region 205 included in a first light-receiving pixel 305A and a set of the semiconductor region 203 and the floating diffusion region 205 included in a second light-receiving pixel 305B.

The light-receiving pixel 305 includes a gate 206 (section gate) of the selection transistor 405, a gate 207 (amplification gate) of the amplification transistor 404, and a gate 208 (reset gate) of the reset transistor 403. The light-receiving pixel 305 further includes an FD connection contact 209, first FD connection wiring 210, and second FD connection wiring 211. Hereinafter, the contact is written as CNT.

The semiconductor region 203 is connected to the floating diffusion region 205 via the transfer gate 204. The electric charge accumulated in the semiconductor region 203 is transferred to the floating diffusion region 205 via the transfer gate 204. The floating diffusion region 205 is connected to the amplification gate 207 via the FD connection CNT 209 and the FD connection wiring 210 and 211.

The floating diffusion region 205 is connected to the reset transistor 403 via the FD connection CNT 209 and the FD connection wiring 210 and 211.

A part of the configuration of the reference pixel 307 is the same as the light-receiving pixel 305. The portion having the same structure as that of the light-receiving pixel 305 is denoted with the same sign as the light-receiving pixel 305. Overlapping description is omitted. FIG. 10 illustrates a configuration in which two reference pixels 307 share one amplification transistor 404. Thus, FIG. 10 illustrates a set of the semiconductor region 203 and the floating diffusion region 205 included in a first reference pixel 307A and a set of the semiconductor region 203 and the floating diffusion region 205 included in a second reference pixel 307B.

The semiconductor region 203 that configures the PD 401 of the reference pixel 307 is connected to a first voltage supply line 212 or a second voltage supply line 213. The first voltage supply line 212 or the second voltage supply line 213 is wiring that configures the output control line 310. Connection between the semiconductor region 203, and the voltage supply lines 212 and 213 is made via a CNT 215, wiring 214, and a via 216. The via 216 connects the voltage supply lines 212 and 213, and the wiring 214.

The voltage supply line 212 and the voltage supply line 213 are arranged above the PD 401 of the reference pixel 307. In other words, the voltage supply line 212 and the PD 401 overlap with each other and the voltage supply line 213 and the PD 401 overlap with each other in plan-view with respect to a light-receiving surface.

In the reference pixel 307, a potential applied to the semiconductor region 203 via the voltage supply line 212 or the voltage supply line 213 is output to the floating diffusion region 205 via the transfer transistor 402.

Figure 11:
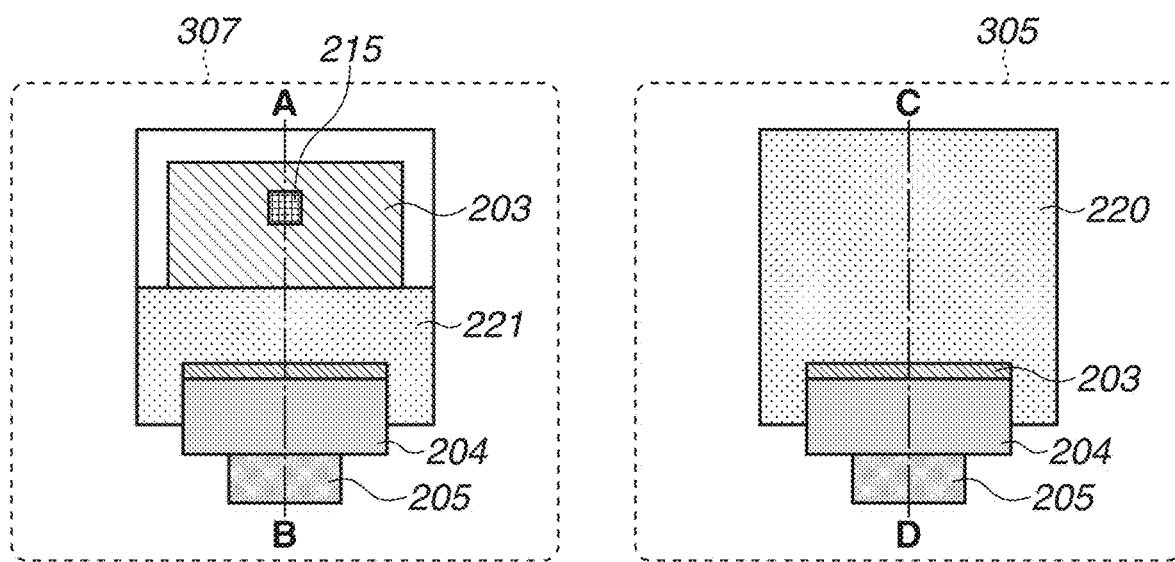
FIG. 11 is a diagram schematically illustrating plane structures of pixels of the imaging device.

The structures of the light-receiving pixel 305 and the reference pixel 307 described in FIG. 10 will be further described with a focus on the PD 401, using FIG. 11. FIG. 11 is a diagram illustrating the light-receiving pixel 305, the PD 401 of the reference pixel 307, and the transfer transistor 402. A member that is the same as the member illustrated in FIG. 10 is also denoted with the same sign as the sign denoted in FIG. 10 in FIG. 11.

First, the light-receiving pixel 305 will be described. The semiconductor region 203 that accumulates the electric charge overlaps with a P-type semiconductor region 220 in plan-view. Although description will be given below using FIG. 12, the semiconductor region 220 functions as a surface protection layer that protects a surface of the semiconductor region 203. Hereinafter, the semiconductor region 220 may be written as surface protection layer.

Next, the reference pixel 307 will be described. A p-type semiconductor region 221 is provided between a portion in the semiconductor region 203, the portion being connected with a CNT 315, and the transfer gate 204, in plan-view.

Figure 12A:
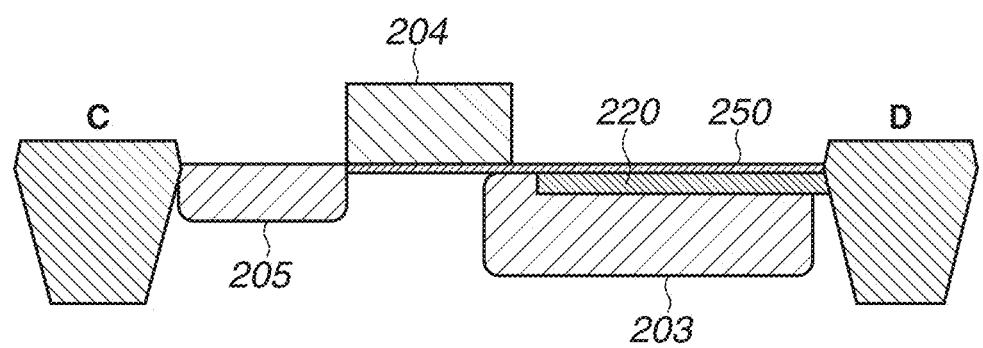
FIGS. 12A and 12B are diagrams schematically illustrating section structures of pixels of the imaging device.
Figure 12B:
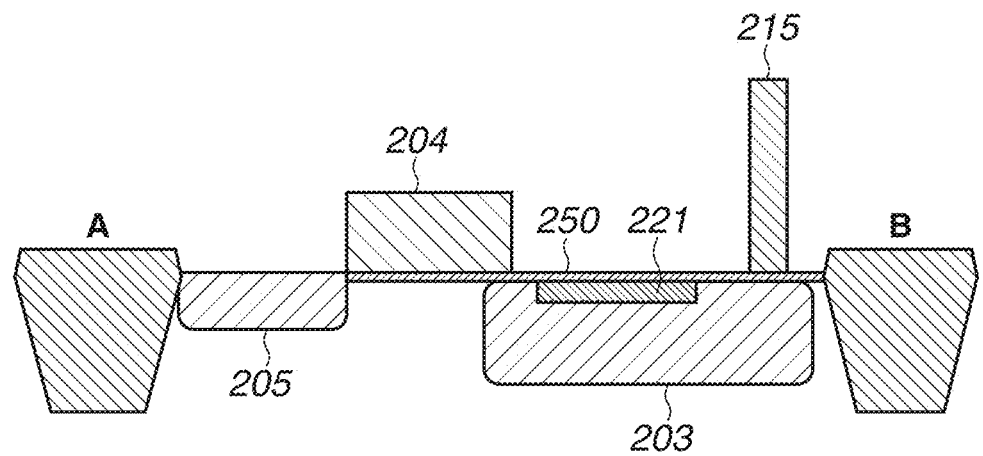

FIG. 12A is a diagram schematically illustrating a section structure of the pixel in the line C-D in FIG. 11. FIG. 12B is a diagram schematically illustrating a section structure of the pixel in the line A-B in FIG. 11.

First, the light-receiving pixel 305 (a section corresponding to the line C-D) illustrated in FIG. 12A will be described. The semiconductor region 203 that accumulates the electric charge is formed below the P-type semiconductor region 220. With the structure, the semiconductor region 220 functions as the surface protection layer that protects the surface of the semiconductor region 203. The semiconductor region 220 is formed between a principal surface 250 and the semiconductor region 203 of a semiconductor substrate.

Next, the reference pixel 307 (a section corresponding to the line A-B) illustrated in FIG. 12B will be described. The CNT 215 is connected to a part of the semiconductor region 203 that accumulates the electric charge. The semiconductor region 221 is not formed below the CNT 215. Further, the semiconductor region 221 is provided between the portion of the semiconductor region 203, the portion being connected with the CNT 215, and the transfer gate 204. Further, in the portion where the semiconductor region 221 and the semiconductor region 203 overlap with each other in plan-view, the semiconductor region 203 is provided below the semiconductor region 221. The semiconductor region 221 is formed between the principal surface 250 and the semiconductor region 203 of the semiconductor substrate.

When the conductivity type of the semiconductor region 203 is the N type, the conductivity type of the semiconductor region 221 is the P type. Thus, the semiconductor region 221 has a lower potential than the semiconductor region 203A. More specifically, the potential of the semiconductor region 221 is a potential between the potential of the transfer gate 204 at the time of OFF and the potential of the semiconductor region 203. When the semiconductor region 221 is not formed, an electric field corresponding to a potential difference between the transfer gate 204 and the semiconductor region 203 is applied to the transfer gate 204. Meanwhile, the present exemplary embodiment includes the semiconductor region 221 and thus an electric field mitigated to an electric field corresponding to a potential difference between the transfer gate 204 and the semiconductor region 221 is applied to the transfer gate 204. With this configuration, a failure of the transfer transistor 402 of the reference pixel 307 can be less likely to occur. In other words, according to the pixel configuration of the present exemplary embodiment, a failure of the reference pixel 307 can be less likely to occur.

A semiconductor region that is the same conductivity type as the semiconductor region 203 and has higher impurity concentration than the semiconductor region 203 may be arranged between the semiconductor region 203 and the CNT 215. According to such a configuration, connection resistance can be decreased.

Figure 3:
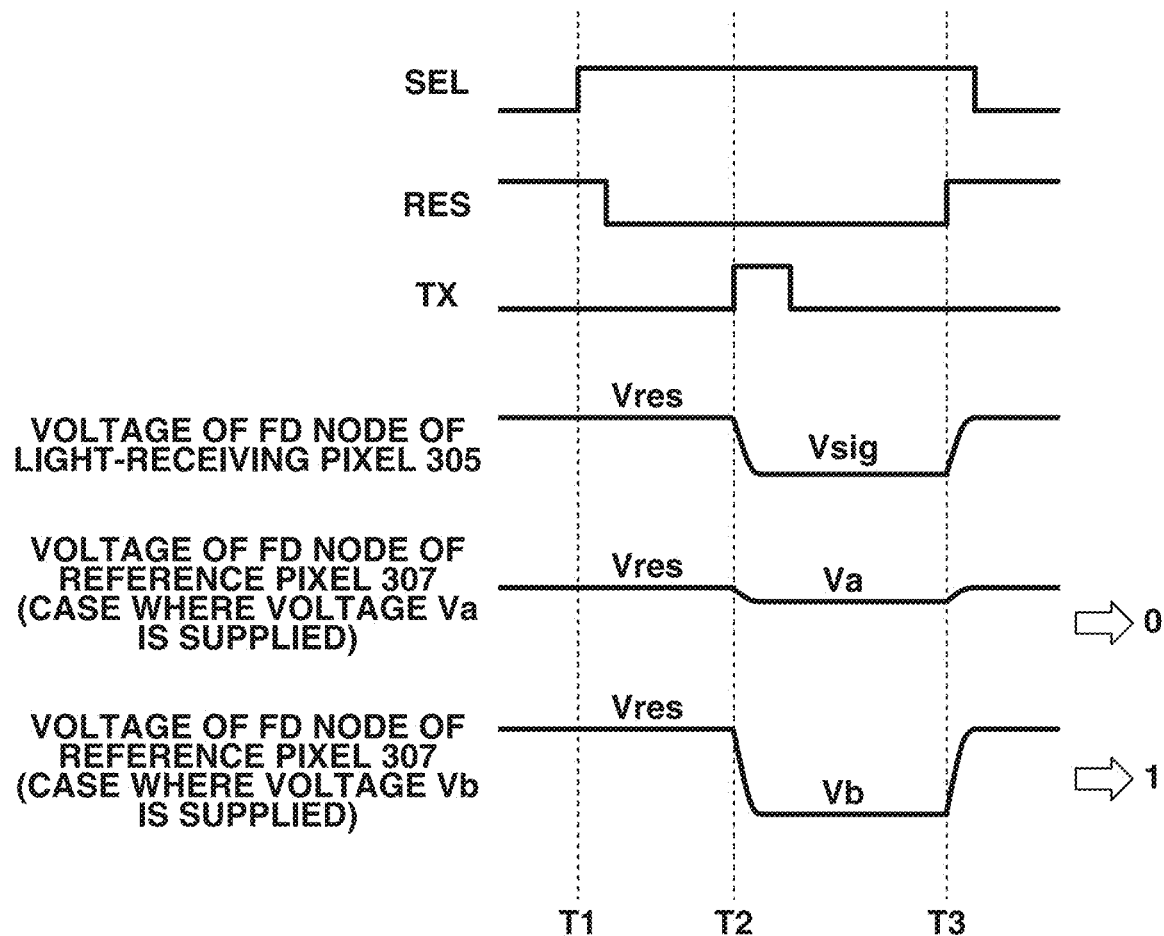
FIG. 3 is a timing chart schematically illustrating an operation of pixels of the imaging device.

Next, operations of the light-receiving pixel 305, the OB pixel 306, and the reference pixel 307 will be described. FIG. 3 is a timing chart of the drive signal SEL, the drive signal RES, and the drive signal TX. When the drive signal is at a high level, the corresponding transistor is turned ON. When the drive signal is at a low level, the corresponding transistor is turned OFF. FIG. 3 further illustrates voltages of the FD nodes.

At a time T1, the selection transistor 405 is turned ON. At this time, the reset transistor 403 is ON. Thus, the voltage of the FD node is the reset voltage Vres. After the selection transistor 405 is turned ON, the reset transistor 403 is turned OFF. The amplification transistor 404 outputs the pixel signal (noise signal) of the level according to the reset voltage Vres to the output line 308.

At a time T2, the transfer transistor 402 is turned ON. In the light-receiving pixel 305 and the OB pixel 306, the electric charge of the PD 401 is transferred to the FD node. The voltage of the FD node is changed from the reset voltage Vres to a signal voltage Vsig. The amplification transistor 404 outputs the pixel signal of the level according to the voltage Vsig to the output line 308.

In the reference pixel 307, when the transfer transistor 402 is turned ON, the voltage Va or the voltage Vb output by the output control circuit 304 is supplied to the FD node. In a case where the voltage Va is supplied, the voltage of the FD node is changed from the reset voltage Vres to the voltage Va. In a case where the voltage Vb is supplied, the voltage of the FD node is changed from the reset voltage Vres to the voltage Vb. The amplification transistor 404 outputs the pixel signal of the level according to the voltage Va or the voltage Vb to the output line 308. The pixel signal output from the reference pixel 307 configures the failure detection signal.

At time T3, the reset transistor 403 is turned ON, and then the selection transistor 405 is turned OFF. With the operations, the operation to read the pixel signals from the plurality of pixels 305, 306, and 307 included in one row is terminated.

The column circuit 302 performs differential processing of the pixel signal, using the noise signal output at the time of resetting. With the processing, the pixel signal with reduced noise can be obtained. The column circuit 302 further performs processing for storing the pixel signal, analogue-digital (AD) conversion, and the like, as needed.

In the present exemplary embodiment, the light-receiving pixel 305, the OB pixel 306, and the reference pixel 307 included in the same row are connected to the common drive control line 309. Thus, the pixel signal is read from the reference pixel 307 in parallel with readout of the pixel signals from the light-receiving pixel 305 and the OB pixel 306. As described above, the pixel signal from the reference pixel 307 configures the failure detection signal that indicates a row to which the reference pixel 307 belongs. With such a configuration, whether the pixel signal is normally output from the specified row can be determined. Note that the light-receiving pixel 305, the OB pixel 306, and the reference pixel 307 included in the same row may be respectively connected to individual drive control lines that are electrically separated. The light-receiving pixel 305, the OB pixel 306, and the reference pixel 307 in the same row being connected to the common drive control line 309 is an example of a configuration to read the pixel signals in parallel.

The failure detection signal configured from the pixel signal output by the reference pixel 307 will be described in detail. The failure detection signal of the present exemplary embodiment comprises a digital signal. More specifically, the pixel signal of the reference pixel 307 corresponds to signal values of bits of the digital signal. As illustrated in FIG. 3, the pixel signal of the level corresponding to the voltage Va indicates "0", and the pixel signal of the level corresponding to the voltage Vb indicates "1".

Figure 4:
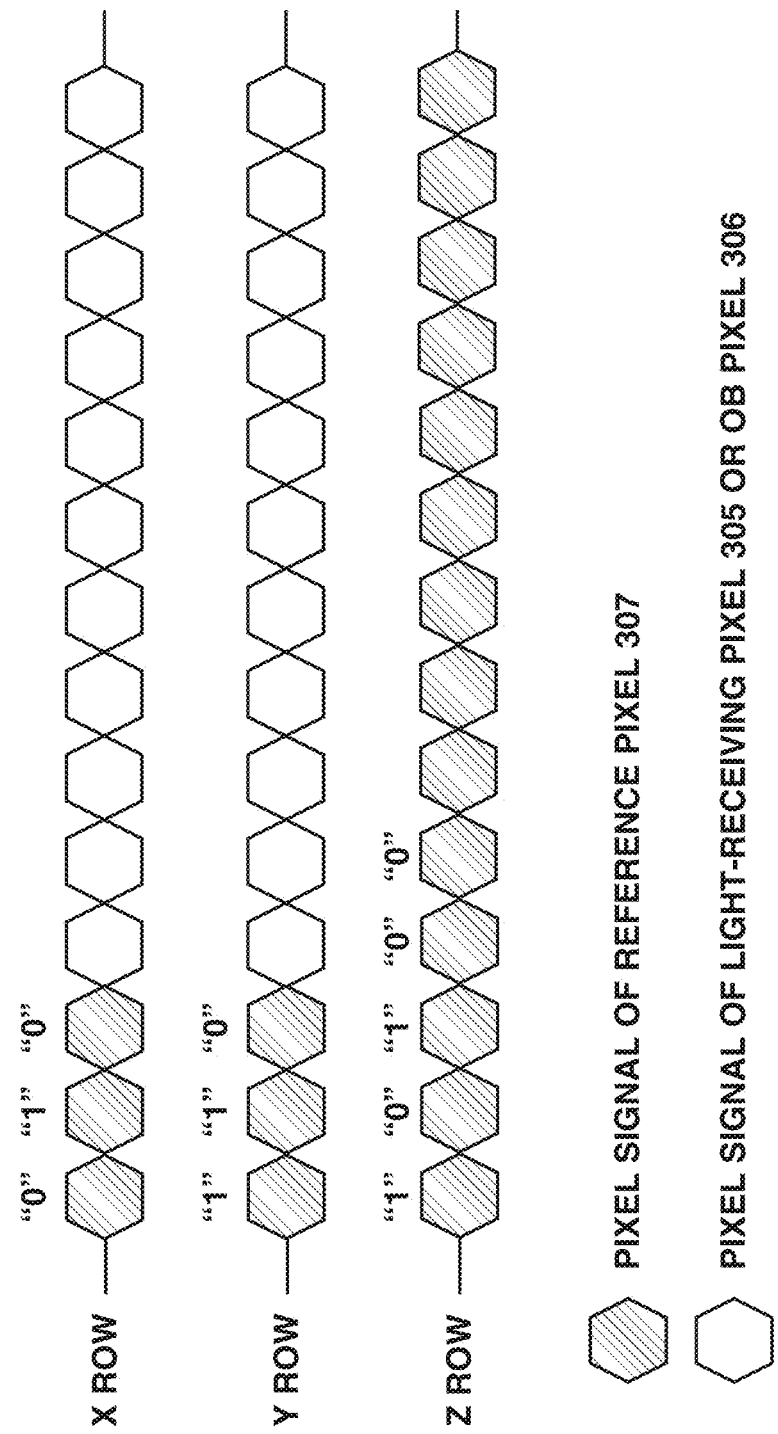
FIG. 4 is a diagram schematically illustrating a failure detection signal output by the imaging device.

FIG. 4 schematically illustrates the pixel signals output from an X row, a Y row, and a Z row illustrated in FIG. 1. The hatched figures represent the pixel signals from the reference pixel 307. The outlined figures represent the signals of the light-receiving pixel 305 or the OB pixel 306.

Both the X row and the Y row include the light-receiving pixel 305, the OB pixel 306, and the reference pixel 307. Thus, the pixel signal (the pixel signal of the light-receiving pixel 305 or the OB pixel 306) of the level according to the incident light, and the pixel signal (the pixel signal of the reference pixel 307) for configuring the failure detection signal, are read in parallel to the column circuit 302. After that, the pixel signal of the reference pixel 307 is first output to the signal processing unit 312 according to control of the horizontal scanning circuit 303. Next, the pixel signal of the light-receiving pixel 305 or the OB pixel 306 is output to the signal processing unit 312. As exemplarily illustrated in FIG. 4, the failure detection signal corresponding to row X has a signal value "010". Further, the failure detection signal corresponding to row Y has a signal value "110". In this way, the signal value of the failure detection signal of the X row and the signal value of the failure detection signal of the Y row are different from each other. The Z row includes only the reference pixels 307. Thus, only the pixel signals from the reference pixels 307, i.e., only the failure detection signals are output from the Z row. The pixel signals output by the reference pixel 307 of the Z row can configure the failure detection signal corresponding to the Z row and the failure detection signals corresponding to columns including the light-receiving pixel 305.

Figure 5:
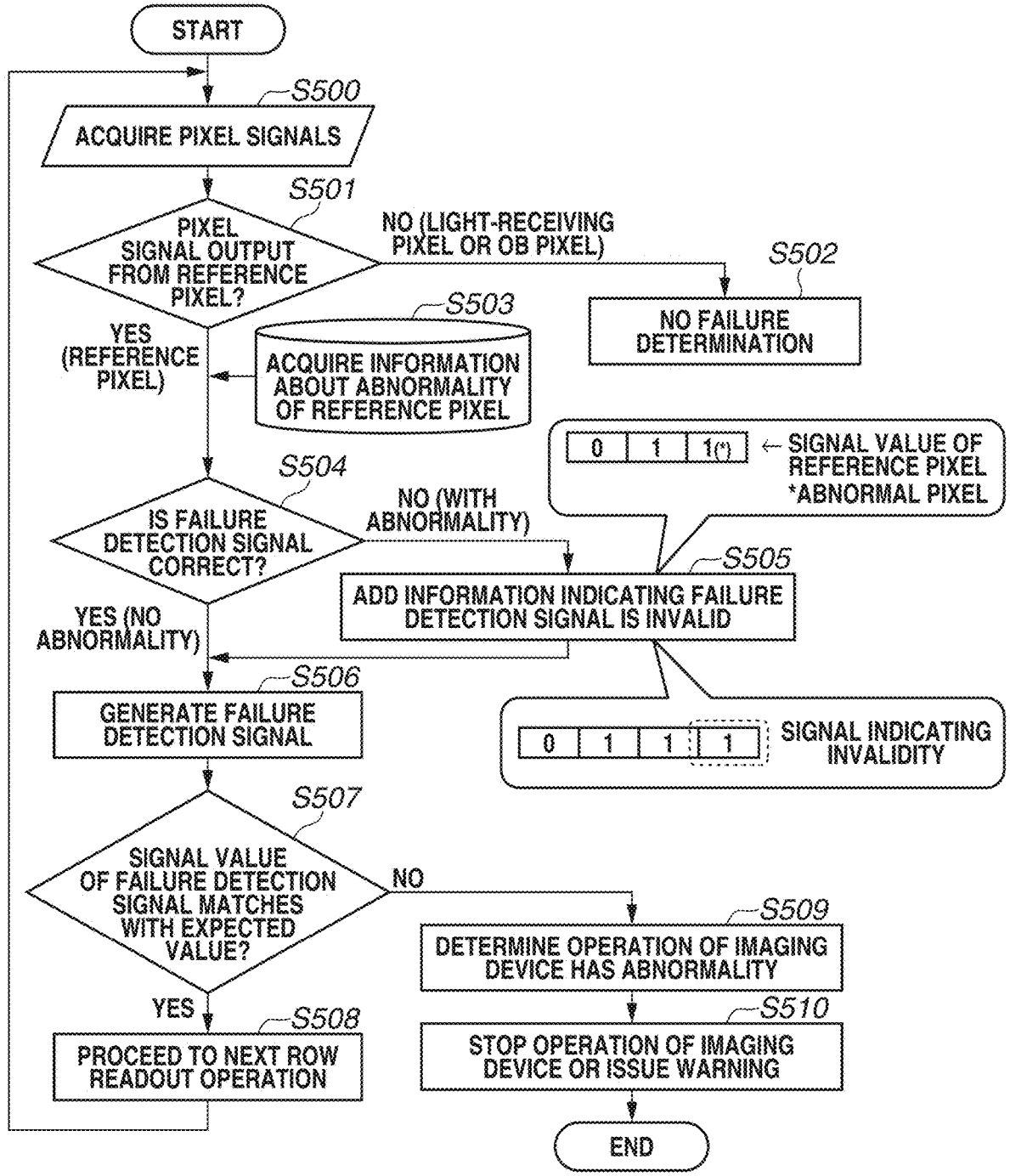
FIG. 5 is a flowchart illustrating a method for determining an operation of the imaging device.

Next, a method for determining whether the imaging device normally outputs the pixel signal based on the failure detection signal will be described. FIG. 5 is a flowchart illustrating a method for determining an operation of the imaging device. This determination processing is performed by the signal processing unit 312, for example.

In step S500, the X row pixel signals are acquired. As described above with reference to FIG. 4, the pixel signals of the light-receiving pixel 305, the OB pixel 306, and the reference pixel 307 are output as the X row pixel signals. In step S501, whether the pixel signals are output from the reference pixels 307 is determined for each pixel signal. When the read and output pixel signal is not the pixel signal output from the reference pixel 307, i.e., when the pixel signal is the pixel signal output from the light-receiving pixel 305 or the OB pixel 306 (NO in step S501), the read pixel signal does not configure the failure detection signal. Thus, in step S502, determination of a failure is not performed. When the read pixel signal is the pixel signal output from the reference pixel 307 (YES in step S501), processing for determining whether the failure detection signal is correct or wrong is performed.

First, in step S503, information about abnormality of the reference pixel 307 is acquired. In the present exemplary embodiment, abnormality information indicating the position of the reference pixel 307 with an abnormality is stored in the memory 311. Subsequently, in step 504, it is determined as to whether the read pixel signal is from the reference pixel 307 that has an abnormality, based on the abnormality information indicating the abnormality of the reference pixel 307. More specifically, whether the position of the reference pixel 307 matches with the position of the abnormal pixel stored in the memory 311 is determined. Here, when the position of the reference pixel 307 does not match with the information of the position of the abnormal pixel, the reference pixel 307 is determined to have no abnormality. More specifically, the failure detection signal configured from the pixel signal output from the reference pixel 307 is determined to have a correct signal value. On the other hand, when the position of the reference pixel 307 matches with the information of the position of the abnormal pixel, the reference pixel 307 is determined to be an abnormal pixel. More specifically, the failure detection signal configured from the pixel signal output from the reference pixel 307 is determined to have a wrong signal value—i.e. it is determined that the signal value is incorrect. In this way, in step S504, the signal processing unit determines whether or not the failure detection signal based the pixel signal output from the reference pixel 307 is correct.

When the failure detection signal is determined to be incorrect (NO in step S504), the processing proceeds to step S505. In step S505, information indicating that the failure detection signal is invalid is added. FIG. 5 illustrates an example in which the last bit of a three-bit digital signal is the pixel signal from the reference pixel 307 with an abnormality. Thus, in step S505, "1" is provided as the information indicating that the failure detection signal is invalid. The method of invalidating the failure detection signal is not limited thereto.

In step S506, the failure detection signal having the signal value obtained in the previous step is generated as the failure detection signal indicating the X row. When the obtained failure detection signal is correct, the signal value of the pixel signal is used as it is. When the obtained failure detection signal is wrong (i.e. incorrect), the failure detection signal that has been invalidated is generated.

In step S507, a signal value of the generated failure detection signal is compared with an expected value of the X row failure detection signal. When the signal value of the failure detection signal matches with the expected value (YES in step S507), the processing proceeds to step S508. In step S508, the imaging device is determined to operate normally. Then, the processing proceeds to the next row readout operation—i.e. the processing proceeds to read the next row in the pixel matrix. Further, when the failure detection signal that has been invalidated is generated, the processing also proceeds to the next row readout operation.

When the signal value of the failure detection signal does not match with the expected value in step S507 (NO in step S507), the processing proceeds to step S509. In step S509, the operation of the imaging device is determined to have an abnormality. More specifically, the imaging device is determined to have a failure. In this case, in step S510, the operation of the imaging device is stopped, or a warning indicating that the imaging device has a failure is issued.

As described above, the present exemplary embodiment determines whether the failure detection signal is correct or wrong based on the abnormality information indicating the abnormality of the reference pixel 307. In this way, the arrangement reduces the possibility of erroneously determining that the imaging device has a failure, and more reliably determines when the imaging device operates normally. As a result, failure of the imaging device is accurately detected.

The above description is based on the failure detection signals of the rows. However, it will be appreciated that the above arrangements may also determine the operation of the imaging device based on the failure detection signals of the columns. In the latter case, the term "row" in the specification may be replaced with the term "column".

A second exemplary embodiment will be described. The present exemplary embodiment is different from the first exemplary embodiment in that, when the failure detection signal is determined to be wrong, the failure detection signal is replaced with another signal. Hereinafter, portions of the second exemplary embodiment that are different from those of the first exemplary embodiment will be mainly described. Portions of the second exemplary embodiment that are like those of the first exemplary embodiment are omitted for brevity.

The configuration of an imaging device according to the present exemplary embodiment is the same as that of the first exemplary embodiment. FIG. 1 schematically illustrates the imaging device according to the present exemplary embodiment. Detailed description thereof is omitted.

Configurations and operations of a light-receiving pixel 305, an OB pixel 306, and a reference pixel 307 of the present exemplary embodiment are the same as those of the first exemplary embodiment. FIG. 2 illustrates equivalent circuits of the light-receiving pixel 305, the OB pixel 306, and the reference pixel 307 of the present exemplary embodiment. Structures of the light-receiving pixel 305 and the reference pixel 307 are illustrated in FIGS. 13 to 15. Further, FIG. 3 is a timing chart of drive signals used by the imaging device of the present exemplary embodiment. Detailed description thereof is omitted.

A failure detection signal used in the present exemplary embodiment is the same as that of the first exemplary embodiment. FIG. 4 schematically illustrates pixel signals output from an X row, a Y row, and a Z row illustrated in FIG. 1. Detailed description thereof is omitted.

Figure 6:
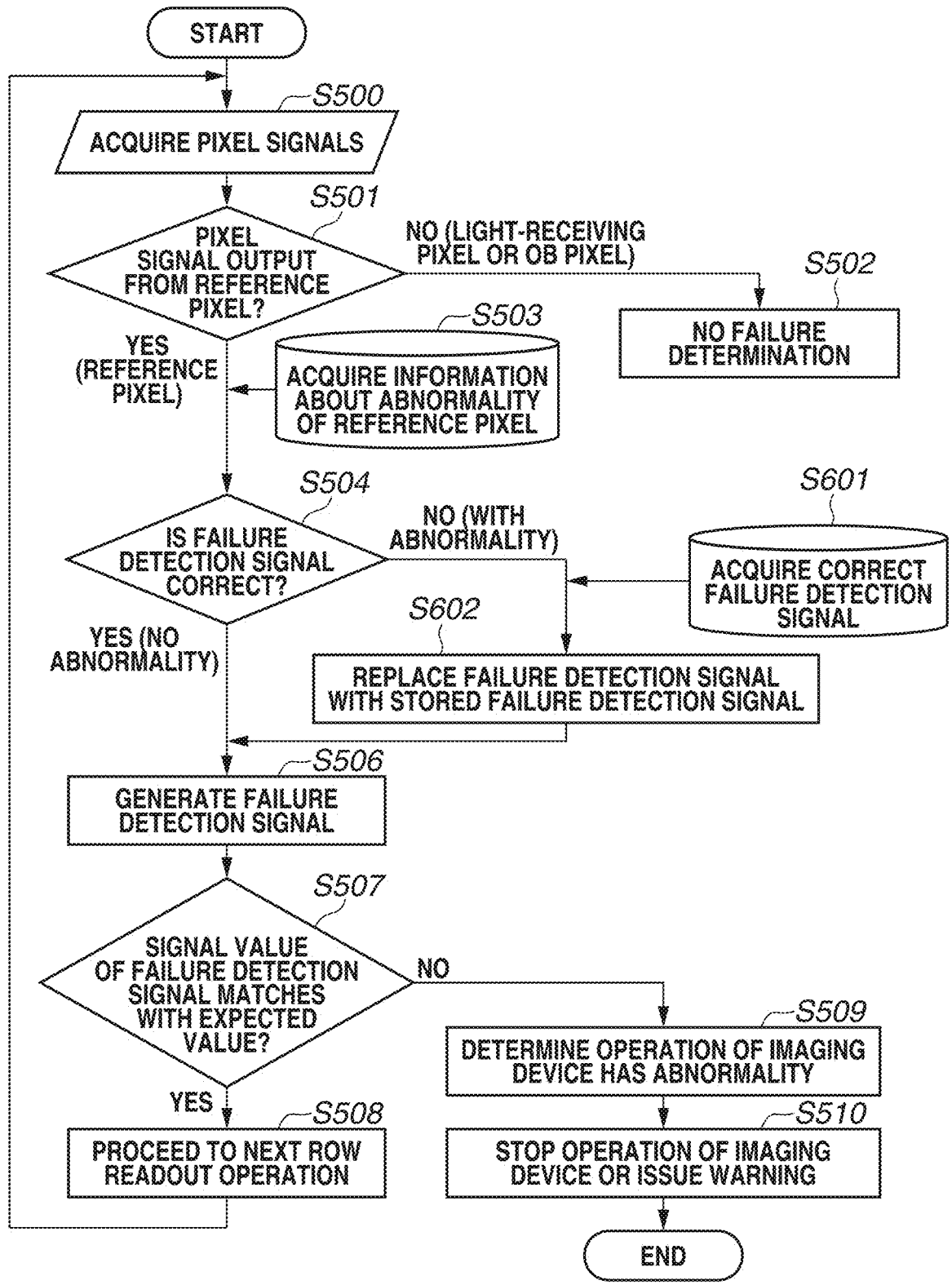
FIG. 6 is a flowchart illustrating a method for determining an operation of the imaging device.

Next, a method for determining whether the imaging device normally outputs the pixel signals based on the failure detection signal will be described. FIG. 6 is a flowchart illustrating a method for determining an operation of the imaging device. This determination processing is performed by a signal processing unit 312, for example. Steps like those in the flowchart of FIG. 5 are denoted with the same reference numerals as those in FIG. 5.

In step S500, X row pixel signals are acquired. As described above with reference to FIG. 4, the pixel signals of the light-receiving pixel 305, the OB pixel 306, and the reference pixel 307 are output as the X row pixel signals. In step S501, whether the pixel signals are output from the reference pixels 307 is determined for each pixel signal. When the read and output pixel signal is not the pixel signal output from the reference pixel 307, i.e., when the output pixel signal is the pixel signal output from the light-receiving pixel 305 or the OB pixel 306 (NO in step S501), the read pixel signal does not configure the failure detection signal. Thus, in step S502, determination of a failure is not performed. When the read pixel signal is the pixel signal output from the reference pixel 307 (YES in step S501), processing for determining whether the failure detection signal is correct or wrong is performed.

First, in step S503, information about abnormality of the reference pixel 307 is acquired. In the present exemplary embodiment, abnormality information indicating the position of the reference pixel 307 with an abnormality is stored in the memory 311. Subsequently, in step 504, whether the read pixel signal is output from the reference pixel 307 with an abnormality is determined using the abnormality information indicating the abnormality of the reference pixel 307. More specifically, whether the position of the reference pixel 307 matches with the position of the abnormal pixel stored in the memory 311 is determined. Here, when the position of the reference pixel 307 does not match with the information of the position of the abnormal pixel, the reference pixel 307 is determined to have no abnormality. More specifically, the failure detection signal configured from the pixel signal output from the reference pixel 307 is determined to have a correct signal value. On the other hand, when the position of the reference pixel 307 matches with the information of the position of the abnormal pixel, the reference pixel 307 is determined to be an abnormal pixel. More specifically, the failure detection signal configured from the pixel signal output from the reference pixel 307 is determined to have a wrong signal value. In this way, in step S504, the signal processing unit determines whether or not the failure detection signal configured from the pixel signal output from the reference pixel 307 is correct (i.e. correct or wrong).

When the failure detection signal is wrong (NO in step S504), the processing proceeds to step S601. In step S601, a correct failure detection signal stored in the memory 311 is acquired. The memory 311 stores the failure detection signal that should be configured from the output signal of the abnormal reference pixel 307, in addition to the abnormality information indicating the abnormality of the reference pixel 307. For example, the memory 311 may store all the failure detection signals. In this case, a related failure detection signal is selected based on the abnormality information. Alternatively, the memory 311 may store only the failure detection signal related to the reference pixel 307 with an abnormality.

Subsequently, in step S602, the failure detection signal configured from the pixel signal of the reference pixel 307 is replaced with another failure detection signal stored in the memory.

In step S506, the failure detection signal having the signal value obtained in the previous step is generated as the failure detection signal indicating the X row. When the obtained failure detection signal is correct, the signal value of the pixel signal is used as it is. When the obtained failure detection signal is wrong, the replaced failure detection signal is generated.

In step S507, a signal value of the generated failure detection signal is compared with an expected value of the X row failure detection signal. When the signal value of the failure detection signal matches with the expected value (YES in step S507), the processing proceeds to step S508. In step S508, the imaging device is determined to be operating normally. Then, the processing proceeds to the next row readout operation.

When the signal value of the failure detection signal does not match with the expected value in step S507 (NO in step S507), the processing proceeds to step S509. In step S509, the operation of the imaging device is determined to have an abnormality. More specifically, the imaging device is determined to have a failure. In this case, in step S510, the operation of the imaging device is stopped, or a warning indicating that the imaging device has a failure is issued.

As per the above description, the present exemplary embodiment determines whether the failure detection signal is correct or wrong using the abnormality information indicating the abnormality of the reference pixel 307. In this way, the present arrangement decreases the possibility of erroneously determining that the imaging device has a failure when the imaging device operates normally. Thus, the failure of the imaging device can be accurately detected.

The operation of the above imaging device is based on the failure detection signals of the rows. However, in other examples, it will be appreciated that the operation of the imaging device may be determined based on failure detection signals of columns. In this case, the term "row" in the specification may be replaced with the term "column".

An exemplary embodiment of a moving body will now be described. The moving body of a third exemplary embodiment is an automobile provided with an in-vehicle camera. FIG. 7A schematically illustrates an external appearance and a principal internal structure of an automobile 100. The automobile 100 includes an imaging device 102, an imaging system integrated circuit (application specific integrated circuit (ASIC)) 103, a warning device 112, and a main control unit 113.

FIG. 8 schematically illustrates a configuration of the imaging device 102 of the present exemplary embodiment. A difference from the imaging device described in the above first and second exemplary embodiments is that the imaging device 102 does not include the memory 311 and the signal processing unit 312 of FIG. 1. Other configurations of the imaging device 102 are the same as the configurations illustrated in FIG. 1. Accordingly, the description of the first and second exemplary embodiments is employed, and here repetitive description is omitted.

The warning device 112 issues a warning to a driver when receiving a signal indicating an abnormality from an imaging system, a vehicle sensor, a control unit, or the like. The main control unit 113 integrally controls operations of the imaging system, the vehicle sensor, the control unit, and the like. The automobile 100 may not include the main control unit 113. In this case, the imaging system, the vehicle sensor, and the control unit individually include communication interfaces (I/Fs), and the communication I/Fs transmit/receive a control signal via a communication network (for example, the controller area network (CAN) standard).

Figure 7B:
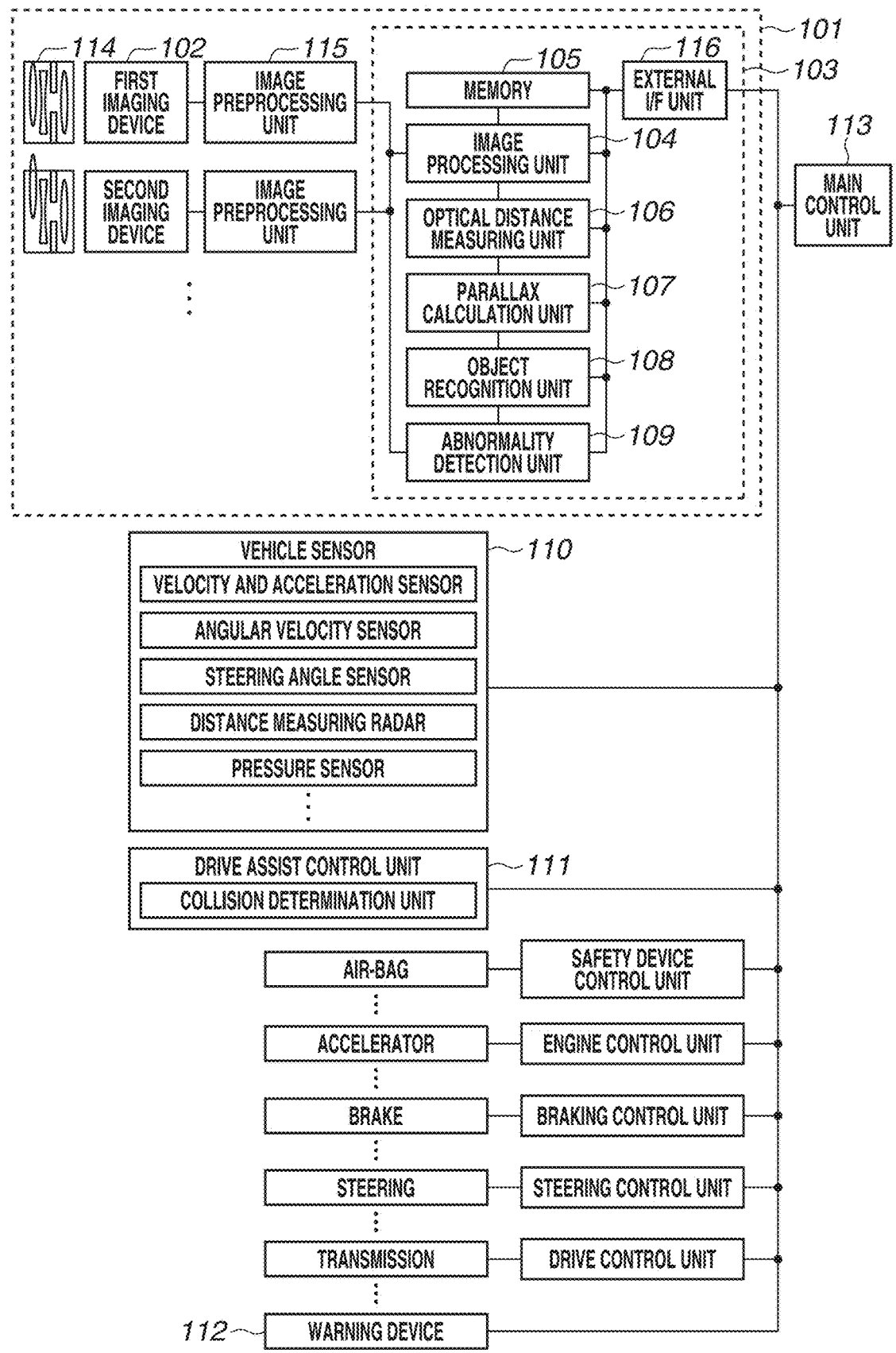
FIG. 7B is a block diagram illustrating a system configuration of the exemplary embodiment of the moving body.

FIG. 7B is a block diagram illustrating a system configuration of the automobile 100. The automobile 100 includes a first imaging device 102 and a second imaging device 102. More specifically, the in-vehicle camera of the present exemplary embodiment is a stereo camera. In the imaging device 102, an object image is focused by an optical unit 114. A pixel signal output from the imaging device 102 is processed by an image pre-processing unit 115 and is then transmitted to the imaging system integrated circuit 103. The image pre-processing unit 115 performs processing such as S-N arithmetic operation and synchronization signal addition.

The imaging system integrated circuit 103 includes an image processing unit 104, a memory 105, an optical distance measuring unit 106, a parallax calculation unit 107, an object recognition unit 108, an abnormality detection unit 109, and an external I/F unit 116. The image processing unit 104 processes the pixel signal to generate an image signal. The image processing unit 104 performs correction of the image signal and complementation of an abnormal pixel. The memory 105 temporarily stores the image signal. Further, the memory 105 may store the position of a known abnormal pixel of the imaging device 102. The optical distance measuring unit 106 performs focusing or distance measurement of the object, using the image signal. The parallax calculation unit 107 performs object comparison (stereo matching) of the parallax image. The object recognition unit 108 analyses the image signal and recognizes objects such as an automobile, a person, a sign, and a road. The abnormality detection unit 109 detects a failure or a wrong operation of the imaging device 102. When detecting the failure or the wrong operation, the abnormality detection unit 109 sends a signal indicating that the abnormality has been detected, to the main control unit 113. The external I/F unit 116 mediates transfer of information between portions of the imaging system integrated circuit 103 and the main control unit 113 or various control units.

The automobile 100 includes a vehicle information acquisition unit 110 and a drive assist control unit 111. The vehicle information acquisition unit 110 includes vehicle sensors such as a velocity and acceleration sensor, an angular velocity sensor, a steering angle sensor, a distance measuring radar, and a pressure sensor.

The drive assist control unit 111 includes a collision determination unit. The collision determination unit determines whether there is a collision possibility with an object based on information from the optical distance measuring unit 106, the parallax calculation unit 107, and the object recognition unit 108. The optical distance measuring unit 106 and the parallax calculation unit 107 are examples of a distance information acquisition unit that acquires distance information to a target object. More specifically, the distance information is information about parallax, a defocus amount, the distance to the target object, and the like. The collision determination unit may determine the collision possibility, using any of the distance information. The distance information acquisition unit may be realized by specially designed hardware or a software module.

An example of controlling the automobile 100 not to collide with another object by the drive assist control unit 111 has been described. However, the present exemplary embodiment is applicable to control of automated driving following another vehicle or control of automated driving not to go over lanes.

The automobile 100 further includes drive portions used for traveling such as an air-bag, an accelerator, a brake, a steering, and a transmission. Further, the automobile 100 includes a control unit of the drive portions. The control unit controls a corresponding drive portion based on a control signal of the main control unit 113.

In the present exemplary embodiment, the abnormality detection unit 109 of the imaging system integrated circuit 103 determines whether the pixel signal is normally output from the imaging device 102. Thus, the abnormality detection unit 109 receives a plurality of failure detection signals output from the imaging device 102. The failure detection signals output from the imaging device 102 are the same as those described in the above-described exemplary embodiments. Further, the method for determining the operation of the imaging device 102 by the abnormality detection unit 109 is the same as the method illustrated in FIGS. 5 and 6 and the description of FIGS. 5 and 6. In other words, all the descriptions of the first and second exemplary embodiments are employed in the present exemplary embodiment.

As illustrated in FIGS. 5 and 6, the abnormality detection unit 109 determines whether the failure detection signal is correct or wrong, using the abnormality information stored in memory 105, wherein the abnormality information indicates the abnormality of a pixel of the imaging device. Then, when the failure detection signal is determined to be wrong, the failure detection signal is invalidated, as illustrated in FIG. 5. Alternatively, the acquired failure detection signal is replaced with another signal, as illustrated in FIG. 8. In this case, the correct failure detection signal for replacement is stored in the memory 105.

In this way, the determination of a failure of the imaging device performed by the signal processing unit 312 in first and second exemplary embodiments is performed by the abnormality detection unit 109 of the imaging system integrated circuit 103 in the present exemplary embodiment. In other words, the imaging system integrated circuit 103 functions as a signal processing unit that determines a failure of an imaging device.

The imaging system used in the present exemplary embodiment is not limited to the automobile, and can be applied to a moving body (moving device) such as a vessel, an aircraft, or an industrial robot. In addition, the imaging system can be applied not only to the moving body but also to devices that use object recognition, such as intelligent transport systems (ITS).

As a modification of the moving body, the imaging device described in the first or second exemplary embodiment may be used as the imaging device 102.

As described above, the moving body of the present exemplary embodiment includes the signal processing unit that determines whether the failure detection signal is correct or wrong, using the abnormality information indicating the abnormality of a pixel of the imaging device. With such a configuration, a possibility of erroneously determining that the imaging device has a failure although the imaging device normally operates can be decreased. Thus, the failure of the imaging device can be accurately detected.

An exemplary embodiment of an imaging system will be described. Examples of the imaging system include a digital still camera, a digital camcorder, a camera head, a copier, a facsimile, a mobile phone, an in-vehicle camera, and an observation satellite. FIG. 9 is a block diagram illustrating a configuration of a digital still camera as an example of the imaging system.

In FIG. 9, a barrier 1001 protects a lens. A lens 1002 focuses an optical image of an object on an imaging device 1004. A diaphragm 1003 varies an amount of light that passes through the lens 1002. As the imaging device 1004, an imaging device illustrated in FIG. 8 is used.

A signal processing unit 1007 performs processing such as correction and data compression for a pixel signal output from the imaging device 1004 to acquire an image signal. Then, in FIG. 9, a timing generation unit 1008 outputs various timing signals to the imaging device 1004 and the signal processing unit 1007, and an overall control unit 1009 controls the entire digital still camera. A memory unit 1010 temporarily stores image data. A storage medium control I/F unit 1011 performs storing to or reading from a storage medium. An attachable and detachable storage medium 1012 such as a semiconductor memory is used for storing or reading of imaged data. An external I/F unit 1013 performs communication with an external computer.

The imaging system may just include at least the imaging device 1004, and the signal processing unit 1007 that processes the pixel signal output from the imaging device 1004. In this case, other configurations are arranged outside the imaging system.

In the present exemplary embodiment, the signal processing unit 1007 determines whether the pixel signal is normally output from the imaging device 1004. Thus, the signal processing unit 1007 receives a plurality of failure detection signals output from the imaging device 1004. The failure detection signals output by the imaging device 1004 are the same as those described in the above-described exemplary embodiments. Further, the method for determining the operation of the imaging device 102 by the signal processing unit 1007 is the same as the method illustrated in FIGS. 5 and 6 and the description of FIGS. 5 and 6. In other words, all the descriptions of the first and second exemplary embodiments are employed in the present exemplary embodiment.

As illustrated in FIGS. 5 and 6, the signal processing unit 1007 determines whether the failure detection signal is correct or wrong, using information about abnormality of a pixel of the imaging device stored in the memory unit 1010. Then, when the failure detection signal is wrong, the failure detection signal is invalidated, as illustrated in FIG. 5. Alternatively, the acquired failure detection signal is replaced with another signal, as illustrated in FIG. 8. In this case, the correct failure detection signal for replacement is stored in the memory unit 1010.

In this way, the determination of a failure of the imaging device performed by the signal processing unit 312 in first and second exemplary embodiments is performed by the signal processing unit 1007 in the present exemplary embodiment.

As a modification of the imaging system, the imaging device described in the first or second exemplary embodiment may be used as the imaging device 1004.

As described above, the imaging system of the present exemplary embodiment includes the signal processing unit that determines whether the failure detection signal is correct or wrong, using the information about abnormality of a pixel of the imaging device. With such a configuration, a possibility of erroneously determining that the imaging device has a failure although the imaging device normally operates can be decreased. Thus, the failure of the imaging device can be accurately detected.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2016-193124, filed Sep. 30, 2016, and No. 2017-145582, filed Jul. 27, 2017, which are hereby incorporated by reference herein in their entirety.

What is claimed is:

1. An imaging device comprising:
a pixel area of a semiconductor substrate;
a plurality of pixels arranged in the pixel area including:
   a light-receiving pixel arranged to receive incident light and output a pixel signal based on the incident light, the light-receiving pixel being arranged in the pixel area; and
   a reference pixel arranged to output a pixel signal for configuring a failure detection signal, the reference pixel being arranged in the pixel area; and
an output control unit connected to the reference pixel and configured to input a control signal to the reference pixel to control a level of the pixel signal to be output by the reference pixel; and
a processing unit arranged to determine whether or not the failure detection signal is correct based on abnormality information indicating the abnormality of the reference pixel.

2. The imaging device according to claim 1, wherein the processing unit is arranged to invalidate the failure detection signal, in response to determining that the failure detection signal is incorrect.

3. The imaging device according to claim 1, wherein the processing unit is arranged to replace the failure detection signal with another signal, in response to determining that the failure detection signal is incorrect.

4. The imaging device according claim 1, wherein:
the plurality of pixels is arranged in a matrix; and
the failure detection signal comprises position data indicating a position of a row of the matrix or a position of a column of the matrix.

5. The imaging device according to claim 4, wherein the processing unit is arranged to further determine whether a pixel signal is read normally from a specified pixel based on the failure detection signal.

6. The imaging device according to claim 1, further comprising memory configured to store the abnormality information.

7. The imaging device according to claim 1, wherein the processing unit is arranged to receive the abnormality information from an external source.

8. An imaging system comprising:
an imaging device; and
a signal processing unit,
the imaging device includes:
a pixel area of a semiconductor substrate;
a plurality of pixels arranged in the pixel area including:
   a light-receiving pixel arranged to receive incident light and output a pixel signal based on the incident light, the light-receiving pixel being arranged in the pixel area: and
   a reference pixel arranged to output a pixel signal for configuring a failure detection signal, the reference pixel being arranged in the pixel area; and
an output control unit connected to the reference pixel and configured to input a control signal to the reference pixel to control a level of the pixel signal to be output by the reference pixel; and
the signal processing unit configured to:
process the pixel signal according to incident light and the failure detection signal for detecting a failure of the imaging device, the pixel signal and the failure detection signal having been output from the pixels of the imaging device, the failure detection signal having been controlled by the output control unit of the imaging device connected to the pixels and configured to input the control signal to the reference pixel to control the level of the pixel signal to be output by the reference pixel, and
determine whether or not the failure detection signal is correct based on abnormality information indicating the abnormality of a pixel of the imaging device.

9. The imaging system according to claim 8, wherein the signal processing unit is arranged to invalidate the failure detection signal, in response to determining that the failure detection signal is incorrect.

10. The imaging system according to claim 8, wherein the signal processing unit is arranged to replace the failure detection signal with another signal, in response to determining that the failure detection signal is incorrect.

11. The imaging system according to claim 8, wherein the signal processing unit is arranged to determine whether a pixel signal is read normally from a specified pixel based on the failure detection signal.

12. The imaging system according to claim 8, further comprising memory configured to store the abnormality information.

13. The imaging system according to claim 8, wherein the signal processing unit is arranged to receive the abnormality information from the imaging device.

14. The imaging system according to claim 8, further comprising a control unit configured to supply a signal for stopping an imaging process by the imaging device, in response to the signal processing unit determining that the imaging device is not operating normally based on the failure detection signal.

15. A moving body comprising:
an imaging device according to claim 1; and
a control unit configured to control the moving body based on an image signal acquired by the imaging device.

16. A moving body comprising:
an imaging system according to claim 8; and
a control unit configured to control the moving body based on an image signal acquired by the imaging system.

17. The moving body according to claim 15, further comprising an informing unit configured to issue a warning signal for indicating that the imaging device has a failure, in response to the processing unit determining that the imaging device is not operating normally.

18. The moving body according to claim 16, further comprising an informing unit configured to issue a warning signal for indicating that the imaging device has a failure, in response to the signal processing unit determining that the imaging device is not operating normally.

\* \* \* \* \*